United States Patent [19]

Dubson

[11] Patent Number: 4,489,826
[45] Date of Patent: Dec. 25, 1984

[54] ADJUSTABLE APPARATUS

[76] Inventor: Philip Dubson, 73-18 192 St., Flushing, N.Y. 11366

[21] Appl. No.: 346,017

[22] Filed: Feb. 5, 1982

[51] Int. Cl.³ .................. B65G 15/60; B65G 21/14
[52] U.S. Cl. .................................. 198/812; 198/864; 414/7; 901/19; 901/14; 901/25
[58] Field of Search .............. 414/1, 4, 7, 735, 744 R, 414/749, 738; 74/89.15, 469, 479; 254/233, 234; 403/43, 44, 45, 46, 47; 198/812, 864; 901/14, 19, 25

[56] References Cited

U.S. PATENT DOCUMENTS

| 2,420,363 | 5/1947 | Espenas | 403/43 |
|---|---|---|---|
| 2,913,267 | 11/1959 | Johnson, Jr. | 403/46 |
| 3,284,964 | 3/1964 | Saito | 414/7 |
| 3,580,099 | 9/1969 | Mosher | 414/1 |
| 3,631,737 | 9/1970 | Wells | 414/738 |
| 4,107,948 | 1/1977 | Molaug | 414/7 |
| 4,300,362 | 11/1981 | Lande et al. | 414/1 |
| 4,337,868 | 7/1982 | Gatty | 74/89.15 |
| 4,393,728 | 7/1983 | Larson et al. | 414/7 |

FOREIGN PATENT DOCUMENTS 422580  9/1974  U.S.S.R. .................. 414/1

Primary Examiner—Joseph E. Valenza
Assistant Examiner—Daniel R. Alexander

[57] ABSTRACT

The disclosed mechanism includes multiple links having adjustable-length drive units connected in series and operated coordinately. The illustrative form of adjustable-length drive unit has oppositely extending elements oppositely threaded in a body that is secured to a mount, the oppositely extending elements being keyed to each other for conjoint rotation that allows extension and contraction of the drive unit. In one form, successive drive units of successive links produce tilting of articulated links in respective planes perpendicular to each other.

30 Claims, 14 Drawing Figures

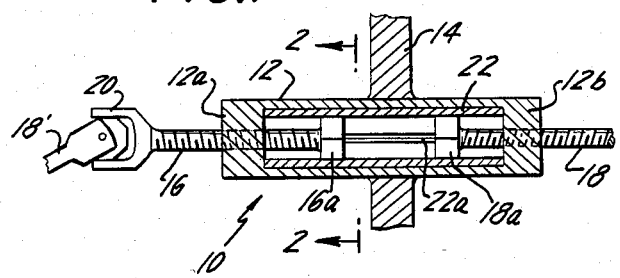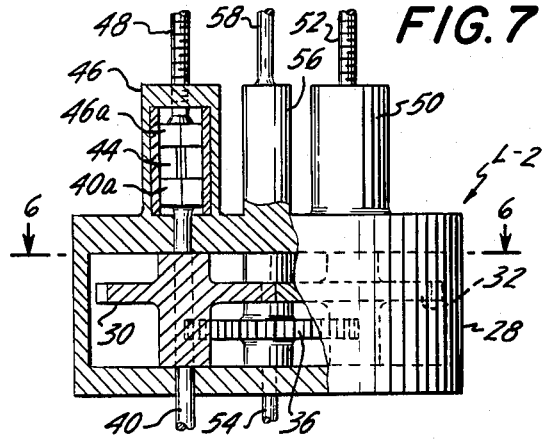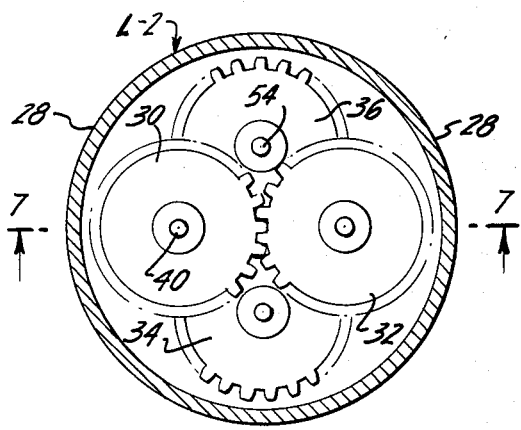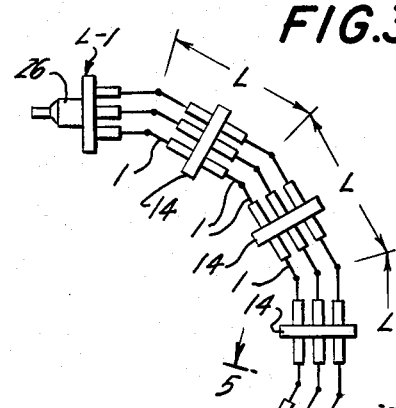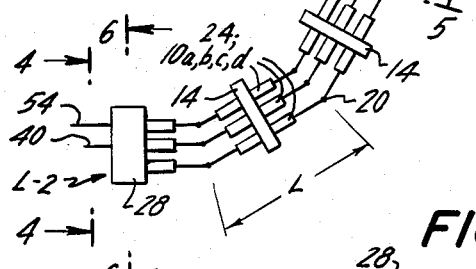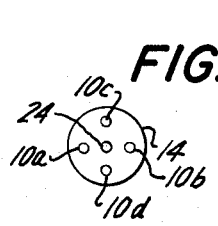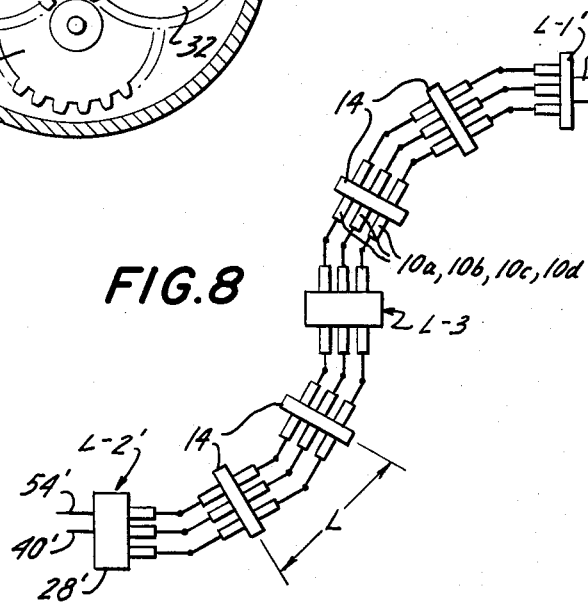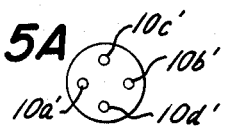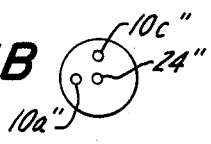

ADJUSTABLE APPARATUS

BACKGROUND OF THE INVENTION

The present invention relates to arms of adjustable curvature or adjustable length, to components thereof, and to applications thereof.

SUMMARY OF THE INVENTION

An object of the invention resides in providing a novel arm including a series of links having a corresponding series of adjustable-length components operated alike and in coordination. In one form, the arm develops controlled curvature, and in another form the arm constitutes a column of adjustable length.

A further object of this invention resides in providing a novel articulated arm capable of developing controlled curvature in two mutually perpendicular planes.

Adjustably curved arms have widely varied uses. They may form part of industrial robots, as for directing a paint-spray gun under program control, and such an arm is useful as a remote-controlled arm having many purposes, for directing a fire hose as an example.

The arms of industrial robots typically have only a few links resembling a person's arm with "shoulder", "elbow" and "wrist" joints that are operated independently to develop large angularity at each joint. In contrast, the present apparatus is capable of developing curvature along its length, roughly comparable to an elephant's trunk. Indeed, the novel adjustably curved arm may be used to actuate portions of a mechanized artificial animal.

Plural arms having adjustable curvature can be used together. In an example, each such arm may extend halfway around a cylindrical object, and the arms may be operated coordinately to grip the object.

Such powered curved arms are also useful as an adjustable frame structure, for example as the support structure of a belt conveyor or a chute that may require adjustment to vary the position of its loading end or its discharge end. As the end position of the conveyor or the chute is varied, the curvature of the support structure of the belt or the chute is also varied to avoid abrupt discontinuities along the path.

Multiple coordinately adjustable components in a series may also be used to provide a straight arm of controlled length, useful as a power-actuated telescopic arm or column. Three or four such columns can be coordinately adjusted to elevate a platform adjustably.

A further object of the invention resides in providing a novel adjustable-length component or drive unit as a "building block" of an arm of adjustable curvature or of adjustable length. However, the adjustable-length component or drive unit has varied uses in itself, as a mechanized hinge for a door or a hatch cover, etc.

Still further, an object of the invention resides in providing novel mechanisms that include an adjustable-length component or drive unit that may be manipulated at one end to extend or retract its remote end. In this aspect of the invention, an exemplary form of drive unit resembles a common turnbuckle. However, unlike a turnbuckle, the exemplary adjustable-length component or drive unit involves a threaded rod at the input end of the component that is turned and operates a splined coupler to cause a threaded rod at the output end of the component to rotate. One rod has a right-hand thread and the other rod has a left-hand thread. The output-end rod projects variably or it is retracted variably, depending on the common direction of rotation of the threaded rods. In a novel arm of varying length or curvature, each such adjustable-length component serves as a rotary actuator for another series-connected component of adjustable length, and for still others in sequence. By providing drive effort at the first rod, all of the other rods of the series of adjustable-length components are rotated alike.

The illustrative apparatus includes two forms of adjustable-length drive units. One form has but one rod threaded in a body to be adjustably extended or retracted. The dual adjustable-length component or drive unit includes axially aligned input and output rods that are oppositely threaded into a main body which is on a base, or which serves as a mount or a base. The endwise aligned rods have heads that are slidably keyed in a splined tube that rotates in the main body. Rotation of one rod communicates rotary drive to the other rod via the splined tube. The reverse threads of the rods cause the rods to move toward or away from each other when one of the rods is turned.

Each such adjustable-length component or drive unit is connected to others as a series of components or drive units in distinctive applications. In such a series, the rod at one end of each component is connected to a rod of another such component. As a result, rotation of a threaded rod at one end of the series of such components causes all the rods of the series to rotate in unison. The series of components becomes elongated or shortened by a dimension equal to the sum of the adjustments of all of the series-connected components.

In one aspect of the invention, a series of links forms an arm of adjustable curvature. Each link has an adjustable-length component or drive unit connected to a corresponding adjustable-length component of the succeeding link(s) in the series. In a preferred embodiment, each link of an adjustably curved arm has two such adjustable-length components or drive units. These are arranged to operate oppositely, one becoming shorter as the other elongates. The adjustable-length components of each link are connected by universal joints to the corresponding adjustable-length components of the next link(s) in the series.

As an alternative to two oppositely adjusted adjustable-length components or drive units in each link, or in addition thereto, a fixed-length component or unit may be included. As a term of reference, both the adjustable-length components or drive units and the fixed-length components may be called "control units." As an adjustable-length component of a given link is operated to change its length, it operates lengthwise relative to another control unit (fixed or adjustable in length) to cause pivoting of the next link in the series about an imaginary axis in some of the mechanisms. The adjustable-length component is arranged so that its ends move parallel to a line extending between the ends of the companion control unit(s).

An adjustably curved arm as outlined above develops continuous curvature as an arc where the adjustable-length components connected in a series are all arranged to operate alike, that is, where they all respond to common operation by becoming elongated or by becoming shortened. However, in a modification, an S-curved arm results where a first series of links is connected appropriately to an end link of a second series of links. Each series of links has a corresponding series of adjustable-length components arranged to operate alike within the series, but the adjustable-length components of one series elongates while the corresponding series of adjustable-length components of the other series becomes shorter in response to common operation.

The curvature thus far considered occurs in a plane, determined by the relationship between the endwise connected drive units of the successive links of the arm and the companion control units of those links. An arm having an additional series of drive units is provided, the additional series of drive units being arranged to develop curvature in a plane perpendicular to the first when operated alone. When both series of drive units are operated, the arm develops curvature out of those planes. Where the links have drive units arranged to curve the arm in mutually perpendicular planes, the drive and control units for producing each curvature of the arm in one plane are utilized as control units acting with the second series of drive units to produce curvature in the second plane perpendicular to the first.

In broad concept, the adjustable-length components of a number of series-connected adjustable-length components may be hydraulic actuators each having a piston and a cylinder. By providing equal and concurrent positive-displacement inputs to each cylinder of a series, that kind of operation may be realized which is analogous to apparatus that depends on the mechanical adjustable-length components discussed above. However, purely mechanical apparatus has environmental advantages, especially at low temperatures and in the vacuum of outer space.

The nature of the invention in its various aspects and other novel features and advantages will be better appreciated from the following detailed description thereof and from the accompanying drawings.

BRIEF DESCRIPTION OF THE DRAWINGS

FIG. 1 is a fragmentary longitudinal cross-section of a novel adjustable-length coupler, representing an aspect of the invention;

FIG. 2 is a cross-section of the coupler of FIG. 1 at the plane 2—2 therein;

FIG. 3 is a greatly reduced side elevation of an articulated arm, representing another aspect of the invention, this embodiment incorporating many of the adjustable-length couplers of FIGS. 1 and 2;

FIGS. 4 and 5 are cross-sections of the articulated arm of FIG. 3 at the plane 4—4 and 5—5 therein;

FIGS. 5A and 5B are cross-sections corresponding to FIG. 5, representing modifications;

FIG. 6 is a cross-section of the articulated arm of FIG. 3, drawn to a larger scale, at the plane 6—6 in FIGS. 3 and 7;

FIG. 7 is a lateral view of a portion of the articulated arm of FIG. 3 drawn to the scale of FIG. 6 and shown partially in cross-section as viewed at the plane 7—7 of FIG. 6;

FIG. 8 is a modification of the articulated arm of FIGS. 3-7;

DESCRIPTION OF THE PREFERRED EMBODIMENTS

Figure 9:
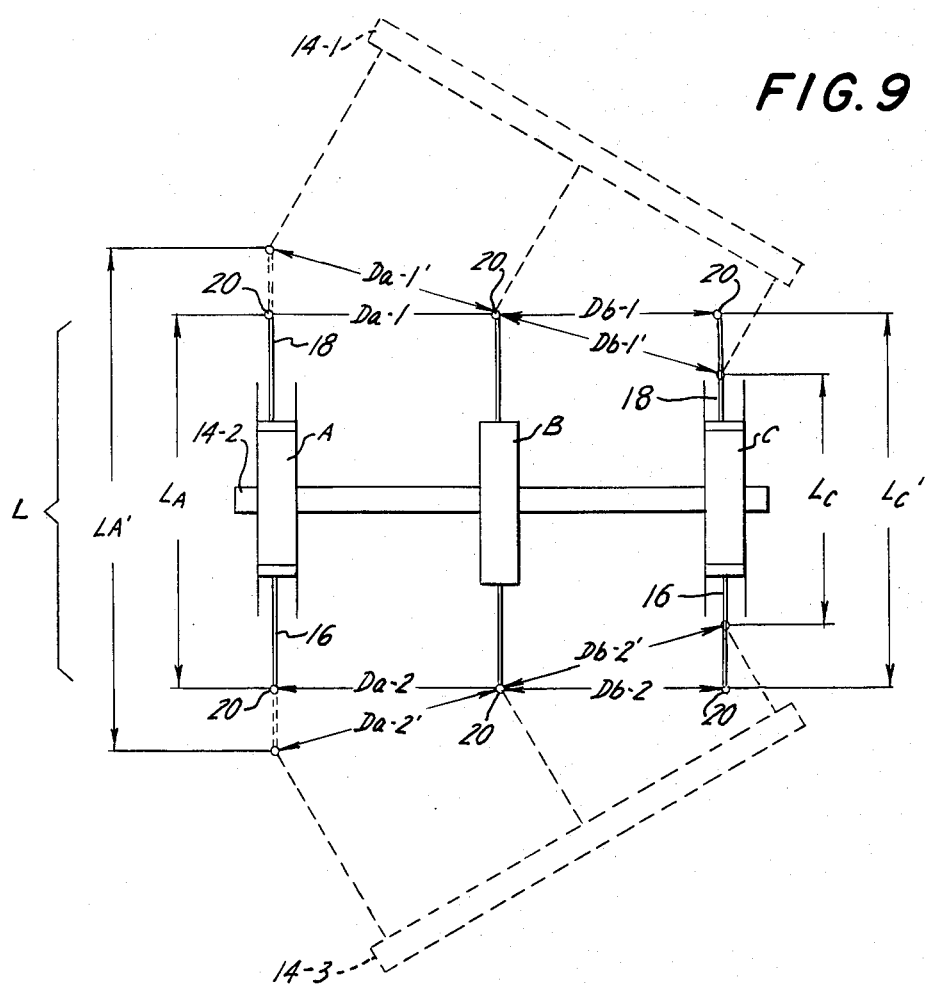
FIG. 9 is a diagram of a representative link in the arms of FIG. 3 and FIG. 7 illustrating its operative relationship to the two adjacent links of such arms.

Referring now to the drawings, a typical adjustable-length component or dual drive unit or drive unit of the arms in FIGS. 3, 8, 10 and 11 shown in FIGS. 1 and 2. Adjustable-length component 10 has a cylindrical body 12 fixed in base 14. End closures 12a and 12b of body 12 have threaded bores through which rods 16 and 18 extend. Each rod bears a universal joint or "universal", only one such universal 20 being shown. Universal 20 forms a pivotal connection between rods 16 of the illustrated drive unit 10 and rod 18' of the adjacent link in the articulated arm.

An internally splined member 22 having an outer cylindrical surface is rotatable within body 12 and member 22 is prevented from endwise movement by engagement with closures 12a and 12b. Rods 16 and 18 have rectangular heads 16a and 18a whose corners are slidably received in four lengthwise grooves 22a in the inner surface of member 22.

The threads of rods 16 and 18 are opposite in sense, one being left-hand and the other being right-hand and of course the threads in end closures 12a and 12b correspond to the rod threads. In operation, if rod 18' is rotated, it causes corresponding rotation of rod 16 which either extends from body 12 variably or is retracted variably into body 12 as a result of the rotation. The extension or retraction depends on the direction of rotation and the sense of the threads. Head 16a is also rotated, forcing splined member 22 and head 18a to rotate. Consequently, rod 18 is rotated and moves lengthwise because it is threaded through closure 12b. Because the pitch of the threads on rods 16 and 18 are equal and opposite, rods 16a and 18a move toward or away from each other when they are rotated. As this occurs, heads 16a and 18a shift along the grooves in splined member 22. The universals at the ends of rods 16 and 18 move toward or away from each other, adjusting the length of component or drive unit 10.

Many drive units 10 are incorporated in the articulated arm of FIGS. 3-7. Each link L in FIG. 3 includes four drive units 10 (FIG. 5), including drive units 10a, 10b, 10c and 10d. These drive units are adjustable-length components connected as four series of adjustable-length components extending along the articulated arm. In addition, each link includes a fifth component 24 at the center of base 14. Component 24 has a body externally resembling body 12 fixed to base 14 and a pair of unthreaded rods extending fixedly from the opposite ends of the body to universals at their remote ends. These universals form pivotal connections between the fixed-length components 24 of adjacent links L along the articulated arm. Accordingly, the fifth components 24 of links L are connected in series along the arm.

At its ends, the arm has two links L-1 and L-2, at the operated and operating ends of the arm, respectively. As its operated end, the arm carries a tool. This could be a paint-spray gun, or a camera or any of a wide variety of devices 26. The articulated arm is capable of curving around obstacles and reaching into inaccessible places. It is understood that link L-1 will normally bear a suitably adjustable structure (not shown) that is subject to control from a remote point, e.g. under program control. That adjustable structure enables device 26 to be aimed as desired after the arm has moved device 26 to the desired position. The internal construction of link L-1 is the same as that of link L-2, to be described.

Link L-2 is a drive head, shown in detail in FIGS. 6 and 7. Housing 28 contains two pairs of gears 30, 32 and 34, 36.

Gear 30 is in mesh with gear 32, and gear 34 is in mesh with gear 36, so that they rotate in opposite directions. Drive shaft 40 extends through bearings in housing 28 and it extends through—and is fixed to—gear 30. At its inner end, shaft 40 has a square head 40a having corners received in internally grooved or splined cylinder 44. Cylindrical body 46 fixed to housing 28 contains and forms a rotary bearing for splined cylinder 44 and prevents cylinder 44 from shifting lengthwise. A threaded rod 48 extends through a correspondingly threaded end closure of body 46 to a square head 48a whose corners are received in the grooves of splined cylinder 44.

Drive shaft 40 constitutes an actuator, having a controlled drive means (not shown). Shaft 40 rotates splined cylinder 44 and, consequently, rod 48 is rotated in the same sense. Body 50 that is fixed to housing 28 contains precisely the same parts as those in body 46, including shaft 52 that projects from body 50. Rotation of gear 30 in one direction by shaft 40 causes rotation of gear 32 in the opposite direction to drive rod 52 lengthwise. The relationships of the gearing and the threads of rods 48 and 52 is such as to cause rods 48 and 52 to move lengthwise in opposite directions. When shaft 40 is rotated so as to cause rod 48 to move progressively outward, rod 52 is retracted progressively. Rods 48 and 52 have universals at their ends that pivotally connect those rods to rods 16 of dual drive units 10a and 10b. Bodies 46 and 60 and their respective threaded rods 48 and 50 form parts of adjustable-length drive units but, unlike dual adjustable-length drive units 10 (FIG. 1), the rods of the drive units of FIG. 7 become extended or retracted from only one end.

Drive shaft 54 extends through a bearing in housing 28 through—and is secured to—gear 36, thereby driving gear 34. Shafts extend upward (as in FIG. 7) through housing 28 to square heads in drive units (not shown in FIG. 7) like that of shaft 40. Threaded rods extending from those drive units are connected by universals to threaded rods 16 of drive units 10c and 10d. The gearing and the sense of the threads is such that drive units 10c and 10d are operated oppositely, one becoming progressively longer as the other becomes shorter.

Drive head L-2 has a fifth component 56 bearing rod 58 midway between rods 48 and 52. Control unit 56, 58 is a fixed unit, connected by a universal to the corresponding control unit 24 of the adjacent link L.

The operation of each link L-1 in the articulated arm, and its relationship to the adjacent links of the arm (links L-1 and L-2 as well as links L) may be best described in relation to FIG. 9. Components A and C are drive units, shown in solid lines at the midpoints of their range of operation. Components A and C are adjustable-length control units, while component B is a control unit of fixed length. At this point, the length $L_A$ of drive unit A equals the length $L_C$ of drive unit C, both being equal to the length $L_B$ of component C. Threaded rods 16 and 18 all have the same pitch. Components A, B and C are parallel.

Due to the reverse rotations of the rods 16 of drive units A and C, as one rod 16 becomes more extended, the other rod 16 becomes equally more retracted and, as described above in connection with FIGS. 1 and 2, rods 18 become correspondingly and equally extended and retracted. Elongation of drive unit A from length $L_A$ to length $L_A'$ occurs in coordination with contraction of drive unit C from length $L_C$ to length $L_C'$. Initially the separations Da-1, Da-2, Db-1 and Db-2 between the universals at the ends of the control units are equal. When the drive units A and C become equally extended and retracted, respectively, the separations Da-1', Db-1', and Db-2' between the universals at the ends of the control units A, B and C becomes larger but they remain equal.

The link L represented in solid lines in FIG. 9 operates the same as, and to the same extent as, the adjacent links which are represented in dotted lines as they appear after the described operation of drive units A and C. Bases 14-1, 14-2 and 14-2 of the three links represented in FIG. 9 are shifted through angles in the plane of the drawing. (Before this operation, bases 14-1, 14-2 and 14-3 were parallel.) FIG. 9 omits the two other drive units of the link shown in solid lines. If drive units A and C represent drive units 10a and 10b of FIG. 5, two other drive units operate correspondingly to shift bases 14-1, 14-2 and 14-3 through angles in a plane perpendicular to the drawing, midway between those drive units. The universals 20 at the ends of the various rods accommodate the angular motions in both planes.

It may be considered that base 14-3 is actually the housing 28 of the drive head. The illustrated drive units 46/48 and 50/52 of drive head operate to extend and retract the threaded rods in the same manner and to the same extent as the rods 16 connected to rods 48 and 52, respectively. Thus, distances Da-2 and Db-2 between the connecting universals grows properly for the links of bases 14-2 and 14-3 as the links are shifted angularly. These two links, or partial links, may be used to operate a closure such as a door.

The described configuration involving equally spaced-apart control units A, B and C, all having threaded rods of equal pitch can, of course, be reproportioned in an equivalent construction by changing the pitches and correspondingly changing the relative spacing between the control units.

In many ways, the described mechanical drive units have distinctive advantages. For example, they remain in their last condition of adjustment without maintaining input drive, since they are inherently self-locking. However, other drive units can be used such as hydraulic types, arranged to have individual and equal positive-displacement inputs to all of the links, in a manner to insure equal displacements (in or out, appropriately) of all rods 16 and 18 that produce angular motion of the links in each plane.

The described construction in which each link has two drive units and a fixed control unit between them has an excellent degree of stability, providing excellent resistance to twisting stresses that might develop. The described series of links has distinctive advantages, in producing an articulated arm of adjustable curvature in three dimensions. However, satisfactory alternatives are contemplated. For example, the fixed control units may be omitted, as in FIG. 5A. Drive units 10c' and 10d', which serve as drive units for angular motions between the links in one plane, also serve as a fulcrum about which drive units 10a' and 10b' operate the links through controlled angles in the perpendicular plane.

In a further alternative represented in FIG. 5B, a single drive unit 10a'' may be used for each link with a control unit 24'' for angular motions in one plane while a single drive unit 10c' may be used with control unit 24'' for angular motions between the links in the perpendicular plane.

FIG. 8 represents a modified articulated arm involving a series of links all having common drive for all the links, yet being arranged to develop segments of equal and opposite curvature. Each of the links and their control units in FIG. 8 are the same as those described in connection with FIGS. 1–7, the corresponding parts being generally designated by the same numerals.

In FIG. 8, a third specialized link L-3 is introduced midway along the series of links. Link L-3 is a reversing link, introducing a direction-reversing drive between each input drive unit and each output drive unit. The reversing feature can be by-passed (by appropriate design) when the single but extended curvature is desired.

The two reversed arcs formed by the articulated links of FIG. 8 can also be achieved by symmetrically reversing the threads of all the rods in the links between L-1' and L-3 as compared to the threads between L-2' and the center link L-3 in FIG. 8.

As noted above, the structure of FIG. 8 includes two groups of links arranged to develop equal and reversely curved arcs in response to common drive input from drive shafts 40' and 54' to all the drive units. As a result, the final link L-1' remains parallel to the drive link L-2' in all conditions of adjustment. Where there is a tool 26' at link L-1', that tool retains a constant aim, yet it can be moved up and down, and from side to side. Where link L-1' is at the delivery end of a chute or a conveyor, it can be shifted selectively to various horizontal receivers which may be other conveyors.

Figure 10A:
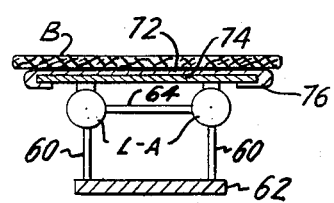
FIG. 10A is a transverse cross-section of the apparatus in FIG. 10 as viewed from the plane 10A—10A therein.
Figure 10:
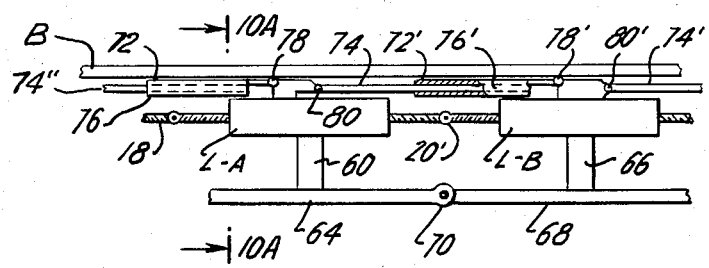
FIG. 10 is a fragmentary view, with portions broken away and shown in cross-section, of a further embodiment of the invention, illustrating features of the invention adapted for use with a belt conveyor.

A modification of FIG. 8 is well adapted for use with a belt conveyor having a delivery end that is adjustable relative to the supply end. A portion of a belt conveyor with adjustable support links is shown in FIGS. 10 and 10A. Links L-A and L-B represent the links in one group L-1' to L-3 of FIG. 8, and the same links L-A and L-B of FIG. 10 also represent the links of the other group between links L-2 and L-3 in FIG. 8.

In FIGS. 10 and 10A, there are two side-by-side adjustable-length components or drive units L-A whose outer bodies (body 12 of FIG. 1) are united to each other. Two side-by-side adjustable-length components L-B are united to each other. A threaded rod of one drive unit L-A is connected by universal joint 20' to a corresponding drive unit L-B. Both drive units L-A (as well as drive units L-B) are operated conjointly by common means (not shown) for causing all the drive units to become equally extended or equally retracted in response to to a given amount of input drive. The two drive units L-A are united by arms 60 that extend rigidly from plate 62 and by an arm 64 extending from one unit to the other. The two drive units L-B are united by arms 66 (only one being shown) extending from plate 68 and by a bar like bar 64. Plates 62 and 68 are articulated at hinge 70.

Two plates 72 and 74 extend from hinges 78 and 80 on the bodies of drive units L-A. Correspondingly, plates 72' and 84' extend from hinges 78' and 80' on drive units L-B. The extremities of plates 72 have slide guides 76 and 76' for plates 74 and 74'' that extend from adjoining links of the series. Conveyor belt B is supported on plates 72, 74, 72', 74', etc.

Drive units L-A and L-B with their plates 64 and 68 may be considered to be part of a first grouping of links, as between links L-2' and L-3 of FIG. 8. Drive units L-A and L-B may be operated alike to draw their extremities closer together, so that a concave configuration of plates 72, 74, 72', 74', etc. will develop. Those plates will act collectively as a concave support for belt B. Another grouping of links comparable to the links between links L-3 and L-1' may be made of a series of drive units L-A, L-B, etc. and their respective support plates 64 and 68. The drive units in this grouping may be operated so as to become equally extended. Belt-support plates 72, 74, 72', 74', etc. will then constitute a convex support for belt B. As in FIG. 8, the two groupings of drive units are connected to each other so that operation of one grouping to produce a concave zone of support for belt B will also produce a convex zone of support for belt B. Operation of all the drive units in the two groupings changes the elevation of the delivery end of the assembly, but a continuously curved guide surface for belt B is maintained by plates 72, 74, etc., and the direction at the discharge end of the composite belt support (normally horizontal) remains constant and parallel to its opposite end.

In each of the applications thus far described of the adjustable-length component or drive unit 10 in FIG. 1, a series of articulated links is involved, and operation of a drive unit at one end of the series causes the series to be variably curved. A series of links L-C, L-C' and L-C'' is shown in FIG. 11, arranged to produce an arm of adjustable length when operated by a rotary driver 84 to one end of the series.

Figure 11:
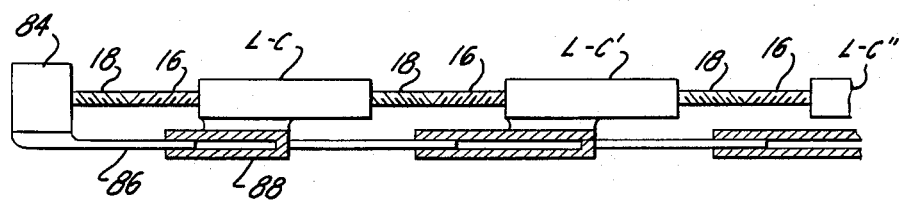
FIG. 11 is a fragmentary view of yet another embodiment of features of the invention as applied to a straight adjustable-length arm or column.

Each drive unit L-C, L-C' and L-C'' in FIG. 11 is of the same internal construction as the drive unit in FIGS. 1 and 2, and rotary driving unit 84 is the same internally as drive unit 44 in FIGS. 6 and 7. In this example, all the rods 16 and 18 have screw threads of equal pitch. When driving unit 84 rotates threaded rod 16 of drive unit L-C, all the rods 16 and 18 of the series of drive units rotate equally. The output threaded rod 18 of drive unit L-C is united to the input threaded rod 16 of the next drive unit L-C'. A straight in-line connection is provided between adjacent rods 16 and 18 of successive drive units in the series, in place of the universals 20. Driving unit 84 has a rod 86 that telescopes out of or into tube 88 as its rod 18 and rod 16 of drive unit L-C are rotated. A bore 88 in the base of drive unit L-C telescopically receives rod 86 of driving unit 86. Rod 86 and bore 88 are parallel to united aligned rods 18 and 16 of units 84 and L-C. Correspondingly, the other drive units L-C/L-C', L-C'/L-C'', etc. have telescoping rods and bores. The overall result is to maintain the series of drive units L-C, L-C', L-C'', etc. in a straight line. The series of drive units changes in length by the screw pitch of driving unit 84 plus twice the screw pitch of rods 16, 18 (since there are two threaded rods for each drive unit) multiplied by the number of drive units in the series. If objectionable twist should develop in the series of links, that may be overcome readily in many ways. For example, a second set of telescopic rods and bores may be added, spaced sidewise from those shown or they may be mounted on the drive units diametrically opposite to the telescopic rods and bores shown.

The nature of the invention, its various aspects, and certain of its applications are apparent from the foregoing illustrative embodiments. However, those of ordinary skill in the art will readily devise other applications and modifications, so that the invention should be construed broadly in accordance with its true spirit and scope.

What is claimed is:

1. An articulated arm comprising a series of links, each of a plurality of said links having a base and first and second control units mounted thereon, the first control units of said links being connected in series with each other at respective first pivotal connections, the second control units of said links being connected in series with each other at respective second pivotal connections, said first and second pivotal connections being spaced apart along respective parallel axes, said first control unit of at least one of said links between adjacent links of the series being a first drive unit having coaxial first drive elements extending oppositely to respective ones of said first pivotal connections and extending along an axis fixed in relation to the base of said one of said links, and means for operating said drive elements of said drive unit along their axes simultaneously and equally in opposite directions relative to the base for thereby causing the links adjacent said one link to tilt in relation to said one link through angles in a first plane when said operating means operates alone.

2. An articulated arm as in claim 1 wherein said second control unit of said one link is a drive unit having a pair of oppositely extending coaxial second drive elements bearing respective ones of said second pivotal connections and extending along an axis parallel to that of said first drive elements and fixed in relation to said base, and wherein said operating means is arranged to operate the second drive unit so that said second drive elements become extended or retracted simultaneously and equally in coordination with and to the same extent as the retraction or extension, respectively, of the drive elements of said first drive unit.

3. An articulated arm comprising a series of links as in claim 2 wherein said one link includes a third control unit of fixed length mounted on said base and having third pivotal connections to the adjacent links of the series, said third pivotal connections being spaced apart along an axis parallel to the axes of said first and second drive elements and said third control unit being mounted so that its axis is midway between said two drive units, said third unit being of fixed length between its pivotal connections to the adjacent links.

4. An articulated arm comprising a series of links as in claim 1 wherein said second unit is of fixed length between said second pivotal connections thereof to second control units of adjacent links in the series.

5. An articulated arm comprising a series of links as in claim 1, wherein said pivotal connections are universals, wherein at least a third control unit is mounted on each of the bases of each of said series of links, the third control units of said links being connected in series with each other at respective third universals, said third control unit of said one link being a third drive unit having coaxial drive elements extending oppositely to the respective ones of said third universals of adjacent links of the series and extending along an axis parallel to that of said first coaxial drive elements and having second means for operating said drive elements of said third drive unit equally and simultaneously in opposite directions relative to said base, said third control unit being arranged relative to said first and second control units to tilt the links adjacent said one link through angles in a second plane perpendicular to said first plane when said second operating means operates alone.

6. An articulated arm as in claim 5 wherein said second control unit is a second drive unit, further including a fourth drive unit mounted on said base, said second and fourth drive units each having oppositely extending coaxial drive elements extending to respective second and fourth universals along respective axes parallel to the axes of the drive elements of said first and second control units and fixed in relation to said base, said fourth drive unit being arranged to tilt the links adjacent said one link through angles in said second plane when said second operating means operates along, and wherein said first operating means and said second operating means are arranged to operate said second drive unit and said fourth drive unit, respectively, so that the drive elements of said second drive unit become extended or retracted equally and the drive elements of said fourth drive unit become extended or retracted equally in coordination with and to the same extent as the retraction or extension, respectively, of the first and third drive elements of said first and third drive units.

7. An articulated arm as in claim 6, wherein said one link includes a fifth control unit having fifth universal pivotal connections to the adjacent links of the series spaced apart along an axis parallel to the aforesaid parallel axes and being mounted on said base midway between said first and second control units and midway between said third and fourth control units, said fifth control unit being of fixed length between said fifth pivotal connections to the adjacent links.

8. An articulated arm as in claim 5, wherein said second control unit is of fixed length between said respective second pivotal connections, wherein the third control units are mounted on the bases of said series of links, respectively, and are connected to each other in series at respective third universals, said third control unit of said one link being a drive unit having coaxial drive elements extending oppositely to respective third universals and being operable along an axis fixed relative to said base and parallel to the aforesaid axes, and said third control units having second means for operating said drive elements of said third drive unit simultaneously and equally in opposite directions relative to the base, and said third drive unit being arranged in relation to said second control unit to tilt the adjacent links in the series through angles in a second plane at right angles to the first plane when said second operating means operates alone.

9. An articulated arm comprising a series of links including end links and at least one intermediate link, each link having a mount and at least first and second control units carried by the mount, first and second pivotal connections between respective first and second control units of each succeeding pair of links in the series, at least the first control unit of each of said links being an adjustable-length drive unit having a drive element extending along an axis fixed in relation to its respective mount and extending to a respective pivotal connection to the drive element of the first drive unit of the next link in the series, each of the drive units of the end links of the series having one drive element and the drive unit of said intermediate link having a pair of said drive elements extending in opposite directions, and common actuating means for concurrently extending or contracting said first drive units relative to said second control units, the first drive units and the second control units of the series of links being related so that operation of the drive units causes adjustable curvature of the arm.

10. An articulated arm having two groups of series-connected links in accordance with claim 9, arranged to be actuated oppositely by said actuating means so that the two groups of links become curved equally and oppositely.

11. An articulated arm comprising a series of links each having a mount and at least first and second control units carried thereby, the first and second control units of each link having pivotal connections to respective first and second control units of the next link in the series, the first control unit of at least one of said links being an adjustable-length drive unit having a body secured to said mount and a pair of drive elements extending oppositely from said body and bearing respective ones of said pivotal connections, and actuating means for adjusting said drive elements of said drive unit concurrently in opposite directions through equal distances relative to said mount, the first and second units being located in relation to each other so that the spacing between the pivotal connections of said first and second units at one end of said one link is equal to the spacing between the pivotal connections of said first and second units at the other end of said one link and so that said spacings remain equal during the longitudinal adjustment of said drive unit.

12. An articulated device including first and second mounts, first and second control units mounted on each of said mounts, said first control units of each successive pair of mounts being secured to each other by a first pivotal connection and said second control units of each successive pair of mounts being secured to each other by a second pivotal connection, at least said first control units on each said mount being a drive unit having an elongated drive element projecting variably therefrom along an axis fixed in relation to the related mount and extending to a said pivotal connection, and common actuating means for projecting or retracting said drive elements of said first drive units equally and simultaneously for thereby causing said bases to move angularly in relation to each other.

13. An articulated device as in claim 12 wherein said second control units of each of said bases are drive units having respective elongated drive elements projecting variably therefrom along axes parallel to the axes of said first drive units and wherein said actuating means is arranged to cause said drive elements of said second drive units to become equally and concurrently retracted or extended in coordination with the extension and retraction of said drive elements of said first drive units.

14. Adjustable apparatus comprising at least a pair of first adjustable-length drive units,
   each of said pair of first drive units comprising a body having spaced-apart threaded portions, first and second coaxial threaded rods extending oppositely along an axis from the threaded portions of said body, respectively, and a rotatable member keying said rods against relative rotation while accommodating relative axial movement between the rods, the rods being oppositely threaded, whereby rotation of said first rod relative to said body causes it to be displaced lengthwise in one direction and causes the second rod to be displaced lengthwise in the opposite direction,
   said first rod of one such drive unit of said pair having a connection to said second rod of the other drive unit of said pair that prevents relative rotation of the connected first and second rods, said first adjustable-length drive units being thereby connected in series,
   and drive means for rotating the keyed-and-connected rods of said pair of drive units relative to their respective bodies, the threads of said rods and body portions being so related that rotational drive of any of the rods causes concurrent extension or retraction of all said rods relative to their respective bodies.

15. Adjustable apparatus as in claim 14 including means constraining the bodies of said adjustable-length drive units to move along a prescribed path during the changes of length of all said drive units.

16. Adjustable apparatus as in claim 15 wherein said prescribed path is a straight line.

17. Adjustable apparatus as in claim 15 wherein said constraining means comprises a projection on the body of each said drive unit that is telescopically received by the body of the next device in the series.

18. Adjustable apparatus as in claim 14 wherein said connection between said first and second rods of said first and second drive units is a universal, said pair of drive units having respective supporting mounts so connected to each other pivotally that operation of said drive means operates said mounts angularly in relation to each other.

19. Apparatus as in claim 14, further including at least a second pair of adjustable-length drive units,
   each of said second pair of drive units comprising a second body having spaced-apart threaded portions, third and fourth threaded rods extending from said threaded portions of said second body, respectively, and a rotatable member keying said third and fourth rods against relative rotation while accommodating relative axial movement between said third and fourth rods, and
   including at least a pair of mounts, each mount having the body of a said first drive unit and the body of a said second drive unit secured thereto with the axis of the coaxial first and second rods of the first drive unit of each mount parallel to the axis of the third and fourth rods of the second drive unit of that mount,
   the third rod of the second drive unit of one of said mounts having a connection to the fourth rod of the second drive unit of the other of said pair of mounts preventing relative rotation between the connected third and fourth threaded rods, said second pair of drive units being thereby connected in series, and
   further drive means for directly rotating any of said third and fourth rods for thereby rotating all of said keyed-and-connected third and fourth rods collectively relative to the respective second bodies.

20. Adjustable apparatus as in claim 19 wherein all said connections are universals, wherein said drive means and said further drive means are coupled for operation of the respective keyed-and-connected rods in unison, and wherein the threads of all said rods are coordinated for producing either elongation of said third rods and said fourth rods and concurrent contraction of said third rods and said fourth rods and concurrent elongation of said first rods and said second rods, for thereby tilting said pair of mounts in relation to each other.

21. Adjustable apparatus as in claim 19 wherein said connections are universals, further including universal connecting means between said mounts related to said connected first and second rods and to said connected third and fourth rods to produce relative angular movement between said pair of mounts about mutually perpendicular axes by operation of said drive means and said further drive means.

22. An articulated arm comprising a series of links including at least a first link having a first-link mount and a second link having a second-link mount,
  said first link having a first variable-length drive unit including a body secured to said first-link mount and having a threaded portion, and said drive unit having a first threaded rod projecting adjustably from said threaded body portion,
  said second link having a first dual variable-length drive unit that includes a body secured to said second-link mount and having oppositely threaded opposite end portions, two oppositely threaded coaxial rods projecting in opposite directions from said threaded end portions, respectively, and a member keying said two oppositely threaded rods to rotate in unison while allowing relative lengthwise movement therebetween,
  a universal that connects said first threaded rod and one of said oppositely threaded rods, the universal allowing angular movement between the axes of said rods while enforcing common rotation of such connected rods, the threading of said threaded rods and threaded end portions being related so that upon rotation, all said rods become either extended or retracted in unison,
  means pivotally connecting said mounts to each other so that rotation of said rods causes relative tilting of said mounts through an angle in a first plane, and
  means for rotating one of said rods and thereby rotating all of said rods.

23. An articulated arm as in claim 22 wherein said first link has a second adjustable-length drive unit duplicating said first adjustable-length drive unit, wherein said second link has a second dual adjustable-length drive unit duplicating said first dual adjustable-length drive unit, wherein a universal connects the rod of said second adjustable-length drive unit and a rod of said second dual adjustable-length drive unit, and wherein said second drive unit and said second dual drive unit are related to the means pivotally connecting said mounts so that rotation of their rods causes relative tilting of said mounts through an angle in a plane displaced from said first plane.

24. An articulated arm as in claim 23 wherein said first and second planes are mutually perpendicular.

25. An articulated arm as in claim 23 or 24 wherein said means pivotally connecting said mounts is fixedly located relative to said mounts.

26. An articulated arm as in claim 22 wherein said first link includes a second adjustable-length drive unit duplicating said first adjustable-length drive unit and wherein said second link includes a second dual adjustable-length drive unit duplicating said first dual adjustable-length drive unit, and wherein a universal connects the rod of said second drive unit to a rod of said second dual drive unit, and wherein said second drive unit and said second dual drive unit constitute said means for pivotally connecting said mounts to each other, and wherein said means for rotating one of the rods of the first drive unit or the first dual drive unit so as to extend or retract the rods thereof, is arranged to simultaneously and reversely rotate a rod of said second drive unit or said second dual drive unit so as to retract or extend the rods thereof simultaneously.

27. An articulated arm as in claim 22 wherein said first link includes a second adjustable-length drive unit duplicating said first adjustable-length and wherein said second link includes a second dual adjustable-length drive unit duplicating said first dual adjustable-length drive unit, and wherein a universal connects the rod of said second drive unit to a rod of said second dual drive unit, said second drive unit and said second dual drive unit being additional to said means for pivotally connecting said mounts to each other and being disposed at the side of said pivotally connecting means which is remote from said first drive unit and said first dual drive unit, and wherein said means for rotating one of the rods of the first drive unit or the first dual drive unit so as to extend or retract the rods thereof, is arranged to simultaneously and reversely rotate a rod of said second drive unit or said second dual drive unit so as to retract or extend the rods thereof simultaneously.

28. An articulated arm as in claim 1, wherein said first drive unit comprises a body having threaded end portions and containing an internally splined cylinder, and wherein said oppositely extending drive elements are a right-hand threaded rod and a left-hand threaded rod in said threaded end portions of the body, each said rod having a portion received in said splined cylinder for keyed rotation therewith while accommodating lengthwise movement of those rods toward and away from each other.

29. An articulated arm as in claim 5 wherein each of said first drive unit and said third drive unit comprises a body having threaded end portions and contains an internally splined cylinder, and wherein said oppositely extending drive elements are a right-hand threaded rod and a left-hand threaded rod in said threaded end portions of the body, each said rod having a portion received in said splined cylinder for keyed rotation therewith while accommodating lengthwise movement of those rods toward and away from each other.

30. A conveyor, including a drive unit as in any of claims 1, 10 or 14, said drive units of the series having hinged plates extending therefrom into overlying relationship with one another, and a conveyor belt on said plates.

* * * * *